(12) United States Patent
Ochiai

(10) Patent No.: US 10,216,386 B2
(45) Date of Patent: Feb. 26, 2019

(54) DISPLAY SYSTEM, DISPLAY METHOD, AND PROGRAM

(71) Applicant: Rakuten, Inc., Tokyo (JP)

(72) Inventor: Yukiko Ochiai, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 377 days.

(21) Appl. No.: 14/901,070

(22) PCT Filed: Jun. 28, 2013

(86) PCT No.: PCT/JP2013/067941
§ 371 (c)(1),
(2) Date: Dec. 28, 2015

(87) PCT Pub. No.: WO2014/207940
PCT Pub. Date: Dec. 31, 2014

(65) Prior Publication Data
US 2017/0322706 A1    Nov. 9, 2017

(51) Int. Cl.
*G06F 3/048* (2013.01)
*G06F 3/0484* (2013.01)
(Continued)

(52) U.S. Cl.
CPC .......... *G06F 3/04845* (2013.01); *G06F 3/011* (2013.01); *G06F 3/017* (2013.01);
(Continued)

(58) Field of Classification Search
CPC .... G06F 3/0481; G06F 9/4443; G06F 3/0488; G06F 3/04883; G06F 3/04845
See application file for complete search history.

(56) References Cited

U.S. PATENT DOCUMENTS

| | | | | |
|---|---|---|---|---|
| 2002/0140666 A1* | 10/2002 | Bradski | ................. | G06F 1/1626 345/156 |
| 2008/0050035 A1* | 2/2008 | Tsurumi | ................. | G06F 3/0486 382/276 |
| 2011/0115822 A1* | 5/2011 | Bae | ...................... | G09B 29/106 345/661 |
| 2012/0194531 A1* | 8/2012 | Yanagawa | ............... | G06F 3/017 345/543 |

(Continued)

FOREIGN PATENT DOCUMENTS

| | | |
|---|---|---|
| JP | 2002-041497 A | 2/2002 |
| JP | 2004-234587 A | 8/2004 |

(Continued)

OTHER PUBLICATIONS

English Translation of International Search Report for PCT/JP2013/067941 dated Aug. 27, 2013.

*Primary Examiner* — Tuyetlien T Tran
(74) *Attorney, Agent, or Firm* — HEA Law PLLC

(57) ABSTRACT

A display system includes a display unit that is provided to a portable terminal and displays a larger size document image than a size of a display area, a displacement amount calculating unit that calculates a displacement direction and a displacement amount of the portable terminal on a virtual surface set along a display screen of the display unit, and a document image specifying unit that specifies, in the document image, a partial area to be displayed in place of a partial area of the document image displayed on the display unit, based on the displacement direction and the displacement amount that are calculated by the displacement amount calculating unit.

13 Claims, 10 Drawing Sheets

(51) Int. Cl.
*G06F 3/0481* (2013.01)
*G06F 3/0346* (2013.01)
*G06F 3/0354* (2013.01)
*G06F 3/01* (2006.01)
*G06F 3/0483* (2013.01)
*G06F 3/0485* (2013.01)
*G06F 3/0488* (2013.01)

(52) U.S. Cl.
CPC ........ *G06F 3/0346* (2013.01); *G06F 3/03547* (2013.01); *G06F 3/0481* (2013.01); *G06F 3/0483* (2013.01); *G06F 3/0485* (2013.01); *G06F 3/04883* (2013.01); *G06F 3/03548* (2013.01)

(56) References Cited

U.S. PATENT DOCUMENTS

2012/0326994 A1    12/2012  Miyazawa et al.
2013/0212522 A1*   8/2013   Fleizach ............... G06F 3/0488
                                                            715/784

FOREIGN PATENT DOCUMENTS

| JP | 2008-084287 A |   | 4/2008  |            |
|----|---------------|---|---------|------------|
| JP | 2012-008827   | * | 1/2012  | G06F 3/0482 |
| JP | 2012-008827 A |   | 1/2012  |            |
| JP | 2012-160006 A |   | 8/2012  |            |
| JP | 2012-194842 A |   | 10/2012 |            |

* cited by examiner

DISPLAY SYSTEM, DISPLAY METHOD, AND PROGRAM

CROSS REFERENCE TO RELATED APPLICATIONS

This application is a National Stage of International Application No. PCT/JP2013/067941 filed on Jun. 28, 2013. The contents of the above document is incorporated herein by reference in its entirety.

TECHNICAL FIELD

The present invention relates to a display system, a display method, and a program.

BACKGROUND ART

Information terminals that are commonly used, such as smartphones and tablets, are capable of displaying, on a display unit, document images in word, text, and PDF formats in which printed documents such as newspaper, magazines, advertisements, and catalogues are digitized. Information terminals have function to change display state of document images (e.g., a document image in PDF format) displayed on display units in response to a user's operation. For example, when a user slides his/her finger while touching a display screen of an information terminal, a document image is scrolled, and when the user touches the display screen with two fingers and widens or narrows the interval of the fingers, the document image is rescaled.

Patent Literature 1 describes a technology for digitizing information provided in print media, such as magazines, advertisements, and catalogues, and displaying the information on a display unit of an information terminal.

CITATION LIST

Patent Document

Patent Literature 1: JP2002-041497A

SUMMARY OF INVENTION

Technical Problem

However, conventionally, only a part of a document image is displayed on a display screen when a size of print media, on which information is presented, is relatively large, such as A4 or A3 size, in order to display a digitized document image in characters in a size to be recognized on an information terminal having a small display screen, such as a smartphone. This is also true when displaying a document image arranged for a terminal having a large display screen, such as a desktop computer or a notebook computer, on a small display screen of an information terminal. As such, the conventional technology has a poor operability for a user.

One or more embodiments of the present invention have been conceived in view of the above, and an object thereof is to provide a display system, a display method, and a program having improved operability when a larger size document image than a size of a display screen is displayed.

Solution to Problem

In order to solve the above described problems, a display system according to the present invention includes a display screen for a portable terminal that displays a larger size document image than a size of a display area, calculating means for calculating a displacement direction and a displacement amount of the portable terminal on a virtual surface set along the display screen, and specifying means for specifying, in the document image, a partial area to be displayed in place of a partial area of the document image displayed on the display screen, based on the displacement direction and the displacement amount that are calculated by the calculating means.

The display system may include image capturing means for the portable terminal that sequentially captures a plurality of images. The calculating means may calculate the displacement direction and the displacement amount based on changes in positions of feature points in the images captured by the image capturing means.

The calculating means may calculate a display magnification of the partial area of the document image displayed on the display screen based on changes in intervals between the feature points in the captured images. The specifying means may specify the partial area in the document image based on the displacement direction, the displacement amount, and the display magnification, respectively calculated by the calculating means.

The display system may further include receiving means for receiving a pause request from a user. When the pause request is received, the specifying means may remove the displacement amount of the portable terminal, which is a displacement amount during a period of time from a reception of the pause request to a release of the pause, from the displacement amount calculated at the time when the partial area is specified.

The display system may further include receiving means for receiving a pause request from a user. When the receiving means receives the pause request, the calculating means may stop calculating processing of the displacement amount until the pause is released.

The receiving means is touch detecting means for detecting a touch on the display screen, and may determine that the pause request is received when the display screen continues to be touched for a predetermined period of time and that the pause is released when the touch is released.

The display system may further include touch detecting means for detecting a touch on the display screen. When a predetermined period of time has passed with the display screen being touched, the display screen may continue to display a partial area of the document image, the partial area being displayed on the display screen at the time the display screen is touched, while the display screen is touched.

The display system may further include determining means for determining whether a partial area to be displayed in place of the partial area of the document image, which is displayed on the display screen based on the displacement direction and the displacement amount respectively calculated by the calculating means, is in a range of the document image, and, when the partial area to be displayed on the display screen is not in the range of the document image, the specifying means may specify a partial area at an edge of the document image.

The display system may further include calibration processing means for determining the displacement amount of the positions of the feature points in the images captured by the image capturing means with respect to the displacement amount.

A display method according to the present invention includes the steps of calculating a displacement direction and a displacement amount of a portable terminal on a virtual surface set along a display screen provided to the portable terminal that displays a larger size document image than a size of the display area, and specifying, in the document image, a partial area to be displayed in place of a partial area of the document image displayed on the display screen, based on the displacement direction and the displacement amount respectively calculated in the calculating step.

A program according to the present invention causes a computer to function as calculating means for calculating a displacement direction and a displacement amount of a portable terminal on a virtual surface set along a display screen provided to the portable terminal that displays a larger size document image than a size of the display area, and specifying means for specifying, in the document image, a partial area to be displayed in place of a partial area of the document image displayed on the display screen, based on the displacement direction and the displacement amount respectively calculated by the calculating means. The program may be stored in a computer-readable information storage medium, such as a CD-ROM and a DVD-ROM.

Advantageous Effects of Invention

According to the present invention, for example, a partial area of the document image displayed on the display screen of the information terminal is replaced with a partial area of the document image that is specified based on the displacement direction and the displacement amount of the information terminal and displayed. As such, when a larger size document image than a size of the display screen is displayed, operability when viewing the document image can be enhanced.

DESCRIPTION OF EMBODIMENTS

An embodiment of the present invention will be described below in detail with reference to the accompanying drawings.

FIG. 1 illustrates a usage mode of the display system according to the embodiment of the present invention. The display system 10 is an information terminal, such as a smartphone and a tablet. Here, a smartphone is taken as an example. The display unit 6 (display screen) of the display system 10 displays a document image in PDF format, for example. The document image may be downloaded from a communication network, such as the Internet, into the display system 10, or stored in the display system 10 from a recording medium, such as a memory card. In the following, a catalog image in which an A3-sized product catalog is converted into PDF format and downloaded from the Internet is taken as an example of the document image. The product catalog presents, for example, photographs of multiple products and information about the products, such as prices. The document image displayed on the display unit 6 may be a document image in any file format, such as a web page and a word file.

Figure 1A:
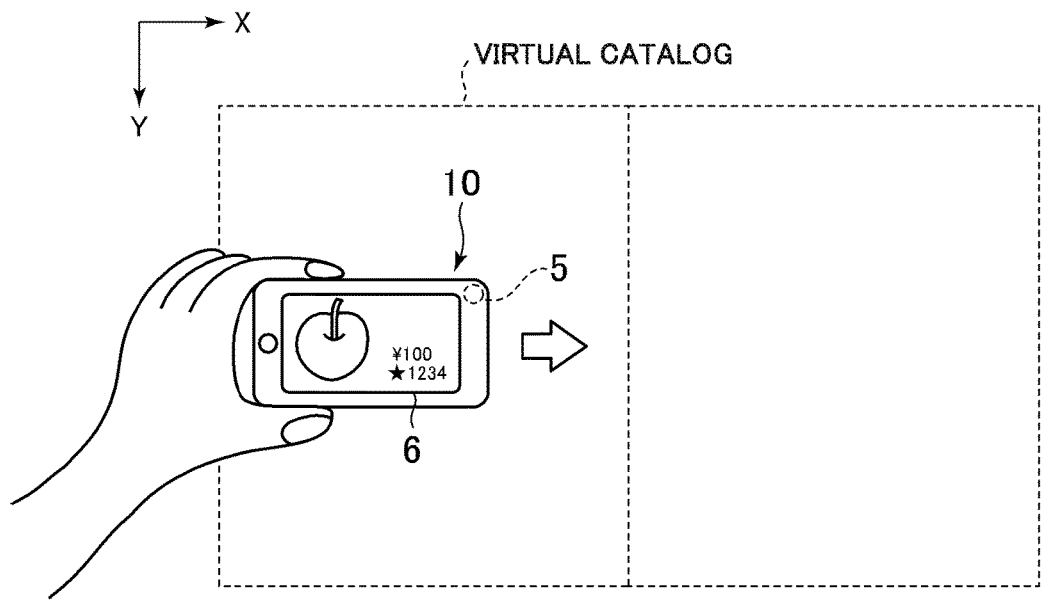
FIG. 1A is a diagram illustrating a use mode of a display system according to an embodiment of the present invention.
Figure 1B:
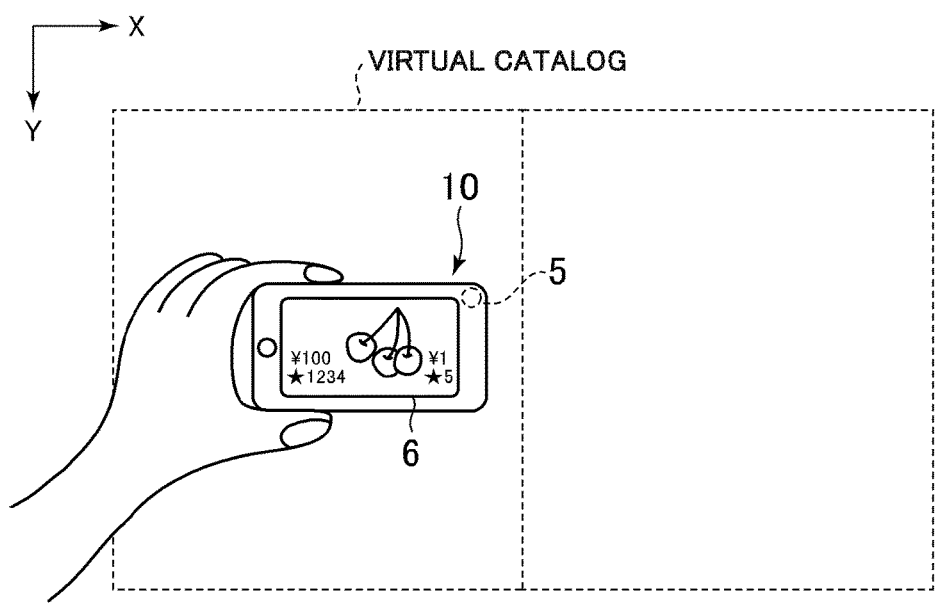
FIG. 1B is a diagram illustrating a use mode of a display system according to an embodiment of the present invention.

When the user downloads all of a catalog image (referred to as "entire catalog image" in the following) corresponding to the A3-sized product catalog into the display system 10, a predetermined area of the catalog image (referred to as "partial image" in the following) is displayed on the display unit 6. For example, as shown in FIG. 1A, the display unit 6 displays a photograph of an item "apple" presented in the product catalog and information on its price. When the user wants to display information about other items presented in the product catalog on the display unit 6, in other words, when the user wants to scroll the partial image displayed on the display unit 6, the user moves the display system 10 in his/her hand to a desired direction. For example, as shown in FIG. 1A, the user moves the display system 10 in the direction of the arrow (X direction). This enables the partial image displayed on the display unit 6 to scroll in response to the movement of the display system 10 as shown in FIG. 1B. In FIG. 1B, a part of an image of an item "apple" (price etc.) and a part of an image of an item "cherry" (photograph etc.) on the right are displayed. In this way, the user moves the display system 10 in any direction and scrolls the partial image displayed on the display unit 6, thereby viewing information on the product catalog as if the product catalog as print media is in front of the display system 10. FIG. 1 illustrates a virtual product catalog in dotted lines.

The size of the document image is an external size of the entire image when displayed in a way that characters are normally visible, and predetermined as, for example, A4 size for PDF format. This display system enables a user to view an entire document image with easy operation when characters included in the document image are displayed in visible size and the external size of the document image exceeds the size of the display screen.

Figure 2:
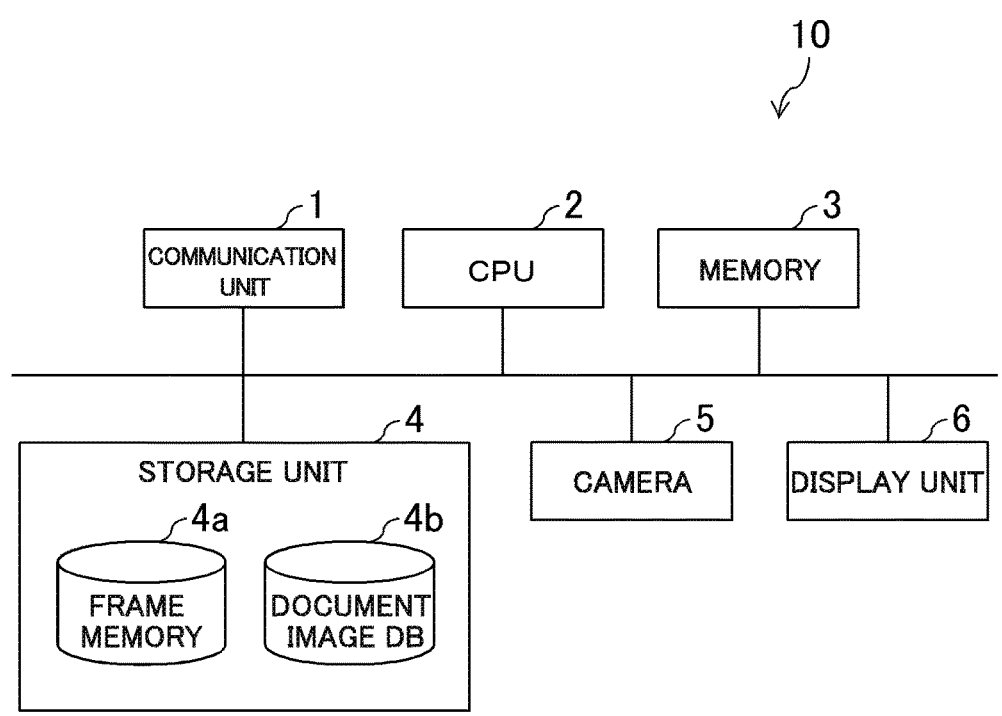
FIG. 2 is a diagram illustrating a hardware configuration of the display system.

FIG. 2 is a diagram illustrating a hardware configuration of the display system 10. As shown in FIG. 2, the display system 10 is a computer including a communication unit 1, a CPU 2, a memory 3, a storage unit 4, a camera 5 (image capturing means), and a display unit 6 (display screen). These hardware components are connected to one another via a bus to receive and send data.

The communication unit 1 sends and receives information through, for example, the Internet. The CPU 2 controls each unit and executes various information processing. The memory 3 stores various programs and data. In the memory 3, a work area of the CPU 2 is also reserved. The display unit 6 displays a document image (here, catalog image) such as documents and photographs. The display unit 6 serves as a touch panel.

The camera 5 sequentially captures images of imaging objects in front of the display system 10 at a predetermined frame rate. The photographing mode of the camera 5 is a video mode in which images are captured at a fixed interval, for example. Alternatively, the camera 5 may be configured to capture images at a fixed interval while a smartphone is moving, and not to capture images when the smartphone is stationary. In this regard, an accelerometer inside the smartphone detects whether the smartphone is moving. This enables to stop photographing while the smartphone is stationary, thereby reducing battery consumption.

The camera 5 is provided to the back side of the display unit 6. Preferably, a capturing direction of the camera 5 is substantially perpendicular to the display screen. The storage unit 4 includes a frame memory 4a and a document image DB 4b. The frame memory 4a sequentially stores captured images captured by the camera 5 at a predetermined frame rate (e.g., 30 fps). The document image DB 4b stores document images (here, entire catalog images) obtained through the communication network or the recording medium, and document images (here, partial images) specified by the display system 10.

Figure 3:
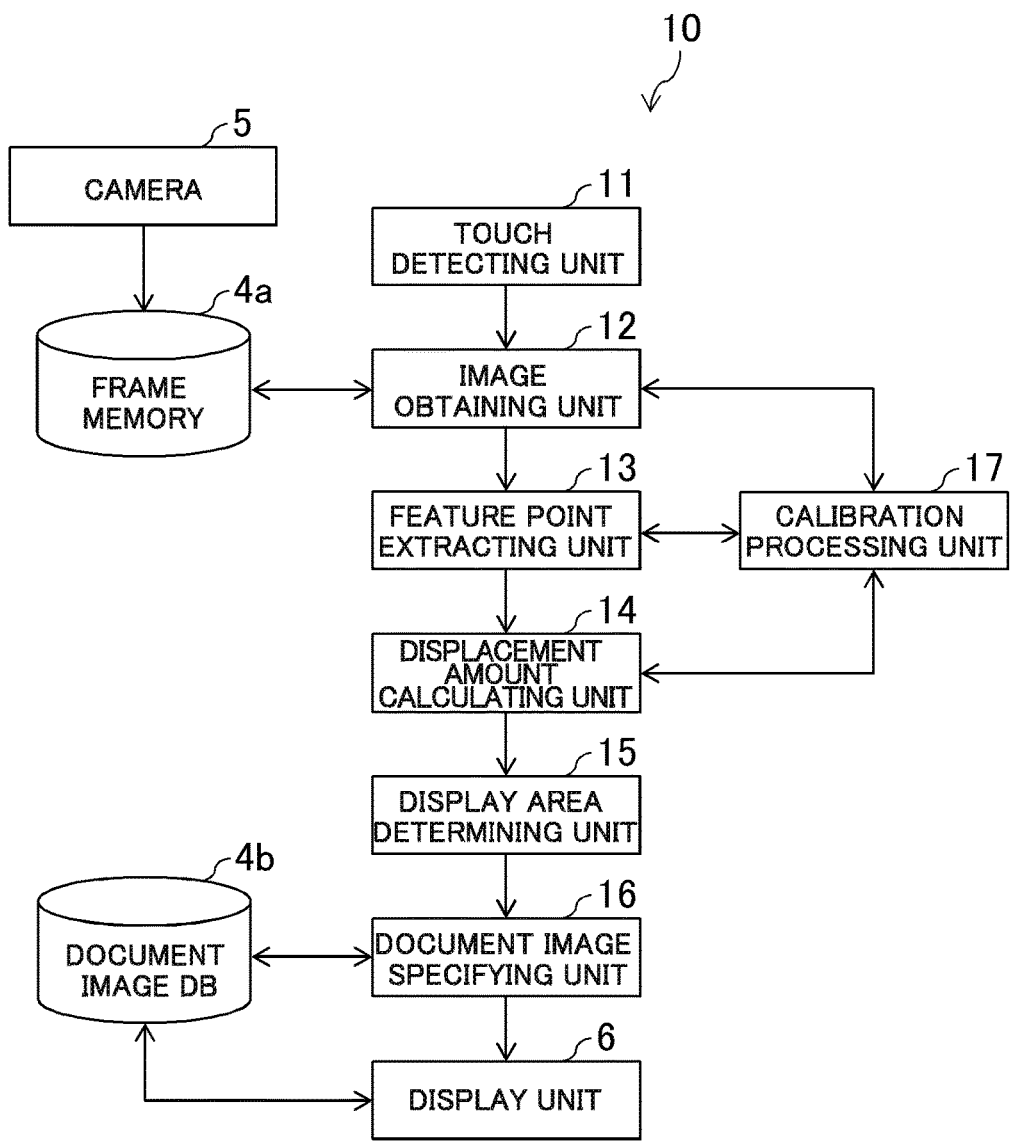
FIG. 3 is a functional block diagram of the display system.

FIG. 3 is a functional block diagram of the display system 10. As shown in FIG. 3, the display system 10 includes a touch detecting unit 11 (touch detecting means, receiving means), an image obtaining unit 12, a feature point extracting unit 13, a displacement amount calculating unit 14 (calculating means), a display area determining unit 15 (determining means), a document image specifying unit 16 (specifying means), and a calibration processing unit 17 (calibration processing means). These elements are implemented when the CPU 2 executes a program stored in the memory 3. The program may be installed to the display system 10 from a computer-readable information storage medium such as a CD-ROM, a DVD-ROM, and a memory card, or downloaded from a communication network such as the Internet.

The touch detecting unit 11 detects a touch position when a user touches a display screen of the display unit 6 with a finger or a pen, for example. Further, the touch detecting unit 11 determines whether a predetermined period of time has passed with the same touch position being touched, that is, whether there is a long touch. A method for detecting touch positions by the touch detecting unit 11 may employ a known technology used in touch panels, such as an electro-static capacitance system.

Figure 4:
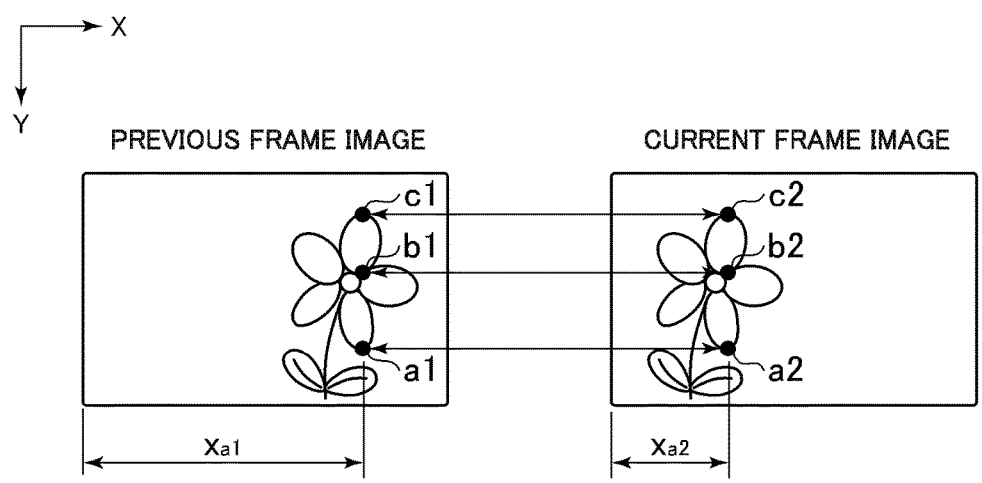
FIG. 4 is a diagram illustrating a previous frame image and a current frame image.

The image obtaining unit 12 obtains a current frame image from the frame memory 4a or the camera 5. In addition, the image obtaining unit 12 obtains an immediate previous frame image from the frame memory 4a. The current frame image captured by the camera 5 and the frame image prior to the current frame are stored in the frame memory 4a and sequentially updated. FIG. 4 shows captured images in two frames in a case where the user moves the display system 10 in the X direction as shown in FIG. 1. Each frame image obtained by the image obtaining unit 12 is not displayed on the display unit 6, but partial images are displayed.

The feature point extracting unit 13 extracts corresponding feature points respectively from the current frame image and the previous frame image obtained by the image obtaining unit 12. The feature point extracting unit 13 matches the current frame image with the previous frame image using the feature points in the current frame image and the feature points in the previous frame image. FIG. 4 shows three feature points a1, b1, and c1 in the previous frame image and corresponding three feature points a2, b2, and c2 in the current frame image. A method for extracting a feature point in an image may employ a known technology, such as a SIFT method.

The displacement amount calculating unit 14 calculates a displacement direction and a displacement amount of the display system 10 on a virtual surface (virtual catalog in FIG. 1) arranged on the display unit 6 (display screen). The virtual surface is a surface parallel to the display screen. Specifically, the displacement amount calculating unit 14 calculates a movement vector V of the current frame image with the previous frame image as a reference, that is, a distance (displacement amount) and a direction (displacement direction) the user has moved the display system 10 based on the processing executed by the feature point extracting unit 13. For example, in FIG. 4, a movement distance in X direction can be calculated by using the coordinates of the feature points a according to the expression of $|xa2-xa1|$. The displacement amount calculating unit 14 may calculate respective movement vectors V by using multiple pairs of corresponding feature points in captured images, and use an average value of the calculated movement vectors V as the movement vector V of the current frame image with the previous frame image as a reference. Further, the displacement amount calculating unit 14 may calculate the displacement direction and the displacement amount by an accelerometer.

Figure 5:
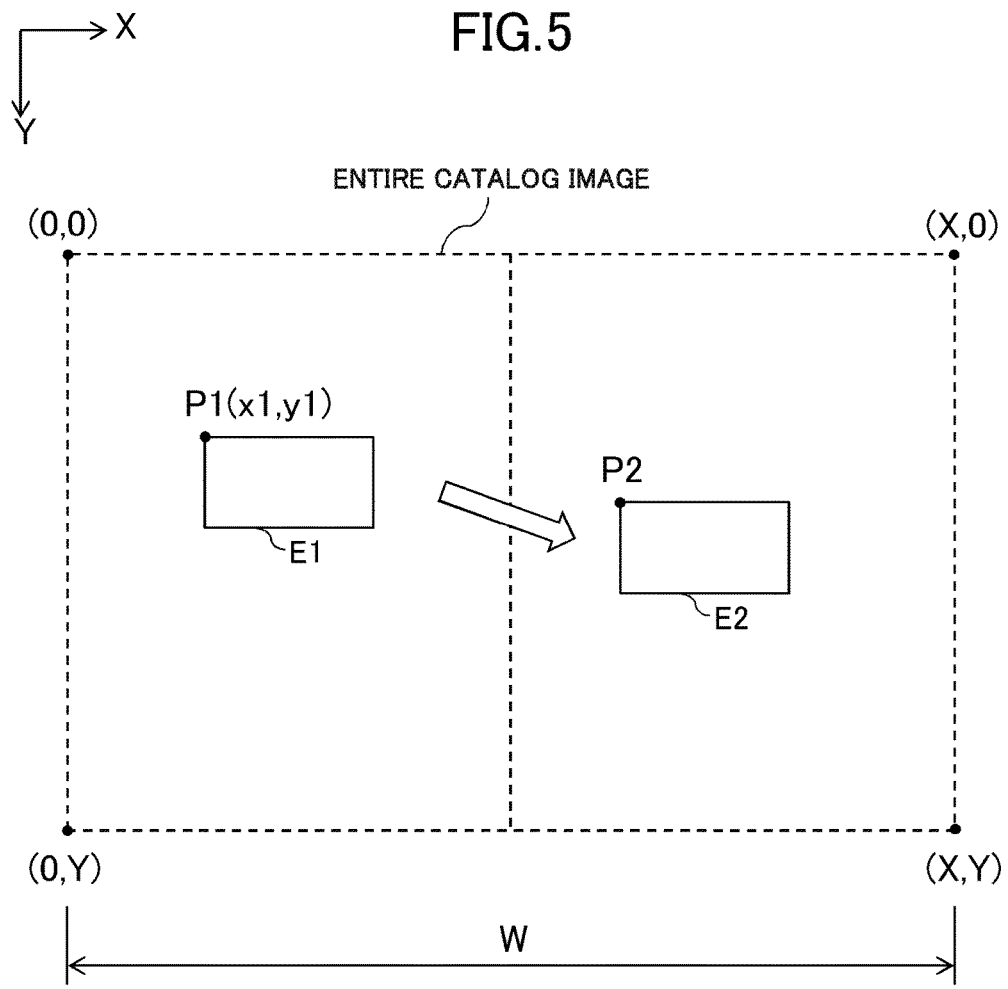
FIG. 5 is a diagram illustrating coordinates of a display area before and after movement.

The displacement amount calculating unit 14 calculates coordinates P2 of the display area E2 of the display unit 6 after the user has moved the display system 10 based on coordinates P1 of the display area E1 of the display unit 6 before the user has moved the display system 10 and the calculated movement vector V. The display areas E are image display areas in the display unit 6, and partial areas in the entire catalog image. The coordinates P of the display areas E are the coordinates (reference position) for specifying the position of the display areas E in the entire catalog image. For example, as shown in FIG. 5, in a case where the entire catalog image is an XY coordinate plane and the XY coordinates at the upper left corner of the entire catalog image is taken as a reference (0,0), the coordinates P1 (x1,y1) at the upper left corner of the display area E1 before the user has moved the display system 10 can be calculated based on the partial image displayed on the display unit 6 before the user has moved the display system 10. Further, by adding lengths of longitudinal and lateral sides of the display areas E to the coordinates P1, coordinates of all apexes defining the display areas E can be calculated.

The displacement amount calculating unit 14 calculates coordinates P2 of the display areas E after the user has moved the display system 10 based on the coordinates P1 and the movement vector V according to the following expression (1).

$$P2=P1+V\times\alpha \qquad (1)$$

In the expression (1) above, α is a correction coefficient. The correction coefficient α is a value for defining a scroll amount of the partial image displayed on the display unit 6 with respect to a movement amount of the display system 10 in a horizontal direction (within the XY coordinate plane). The correction coefficient α is determined by the calibration processing unit 17 described below. The correction coefficient α may not be determined by the calibration processing unit 17, but may be a predetermined fixed value or a manually variable value.

The displacement amount calculating unit 14 calculates display magnification Z of the current frame image based on the feature points extracted by the feature point extracting unit 13. Specifically, the displacement amount calculating unit 14 calculates change rate C according to the following expression (2), based on a distance t1 between two feature points in the previous frame image and a distance t2 between corresponding two feature points in the current frame image.

$$C = t2/t1 \qquad (2)$$

Figure 6:
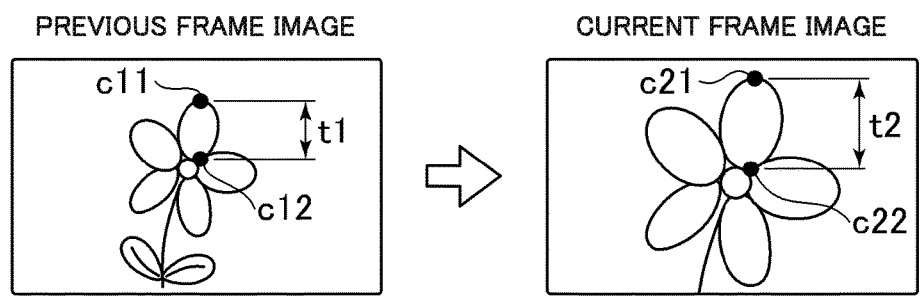
FIG. 6 is a diagram illustrating a previous frame image and a current frame image.

For example, as shown in FIG. 6, a captured image is enlarged as the display system 10 approaches an object to be captured (flower in FIG. 6), and a distance between the two feature points is increased. As such, based on the distance t1 (=|C11−C12|) between feature points C11 and C12 in the previous frame image and the distance t2 (=|C21−C22|) between feature points C21 and C22 in the current frame image, the change rate C of the current frame image can be calculated.

Subsequently, the displacement amount calculating unit 14 calculates display magnification Z of the current frame image based on the calculated change rate C. When the display magnification of the previous frame image is Z1, display magnification Z2 of the current frame image is calculated according to the following expression (3).

$$Z2 = Z1 + C \times \beta \qquad (3)$$

In the expression (3) above, β is a correction coefficient. The correction coefficient β is a value for defining enlarging or reducing amount of the partial image displayed on the display unit 6 with respect to the movement amount of the direction (direction Z) perpendicular to the XY coordinate plane of the display system 10. The correction coefficient β is set in advance by experiments, for example, so as to optimize the enlarging or reducing amount of the partial image with respect to the movement amount of the display system 10.

The display area determining unit 15 determines whether the display areas E extend off the range of the entire catalog image on the XY coordinate plane of the entire catalog image after the user has moved the display system 10. Specifically, the display area determining unit 15 determines whether coordinates (reference position) of at least one of four apexes specifying the range of the display area E2 after the display system 10 has been moved as shown in FIG. 5 is outside the range of the entire catalog image.

The document image specifying unit 16 specifies, in the entire catalog image, a partial image to be displayed in place of the partial image displayed on the display unit 6, based on the displacement direction and the displacement amount calculated by the displacement amount calculating unit 14. Specifically, the document image specifying unit 16 specifies, in the entire catalog image stored in the document image DB 4b, a partial image after the display system 10 has been moved, based on the coordinates P2 of the display area E2 after the display system 10 has been moved and the display magnification Z2 of the current frame image, each calculated by the displacement amount calculating unit 14.

The display unit 6 updates the partial image displayed on the display unit 6 to the partial image specified by the document image specifying unit 16, and displays the updated image. For example, the display unit 6 updates the partial image shown in FIG. 1A to the partial image shown in FIG. 1B, and displays the updated image. The display unit 6 sequentially displays partial images specified by the document image specifying unit 16, thereby enabling images being scrolled on the display screen.

The calibration processing unit 17 calculates a correction value (correction coefficient α) that defines a scroll amount of a partial image displayed on the display unit 6 with respect to the movement amount of the display system 10. For example, when a correction coefficient α is set to 2, according the expression (1) above, a partial image of the display unit 6 is scrolled by 20 cm when the user moves the display system 10 in the X direction by 10 cm. Here, the calibration processing unit 17 determines a correction coefficient α such that the maximum width in which the user moves the display system 10 in the horizontal direction (within XY coordinate plane) corresponds to the lateral width W of the entire catalog image (see FIG. 5) displayed on the display unit 6. The specific operations of the calibration processing unit 17 will be discussed below.

Figure 7:
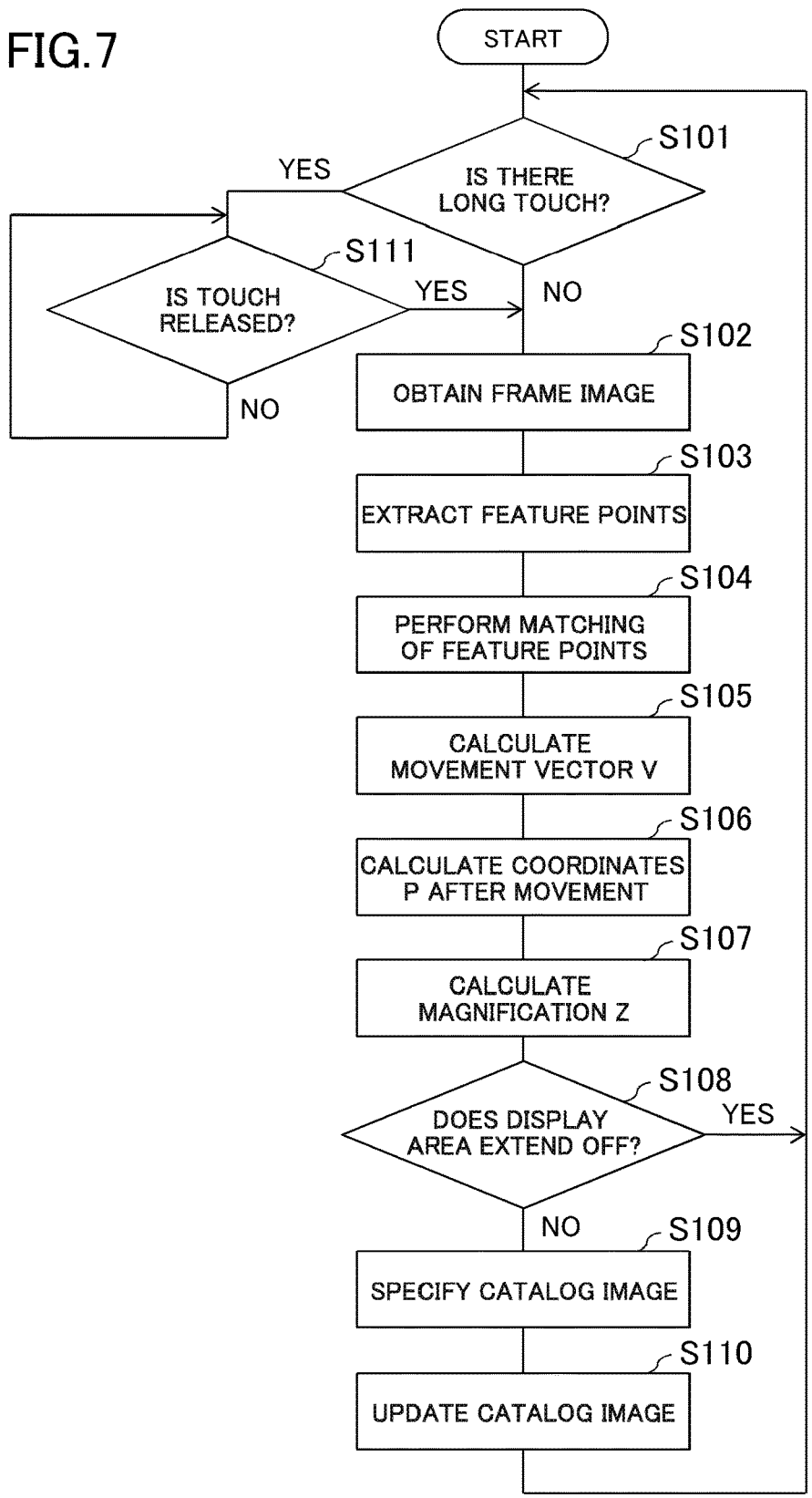
FIG. 7 is an operational flow chart of the display system.

FIG. 7 is an operational flow chart of the display system 10. Here, as an example, operations of the display system 10 are explained in a case where the user moves the display system 10 in a state shown in FIG. 1A to a state shown in FIG. 1B. For convenience, a captured image that is captured by the camera 5 in the state of FIG. 1A is a previous frame image shown in FIG. 4, and a captured image that is captured by the camera 5 in the state of FIG. 1B is a current frame image shown in FIG. 4.

When the user moves the display system 10 in the X direction by any distance while the partial image (item "apple") of FIG. 1A is displayed on the display unit 6, the following operations will be performed.

The touch detecting unit 11 determines whether there is a long touch by the user on the display screen of the display unit 6 (S101). For example, the touch detecting unit 11 determines that there is a long touch when one second has passed with any position on the display screen being touched.

If there is no long touch, the image obtaining unit 12 obtains the previous frame image and the current frame image (see FIG. 4) from the frame memory 4a (S102).

Next, the feature point extracting unit 13 extracts corresponding feature points respectively in the previous frame image and the current frame image (see FIG. 4) obtained in S102 (S103), and performs image matching (S104).

The displacement amount calculating unit 14 then calculates a movement vector V of the display system 10 based on processing results of S103 and S104(S105). In FIG. 4, "right (X) direction, |xa2−xa1|" is calculated as a movement vector V.

Figure 8A:
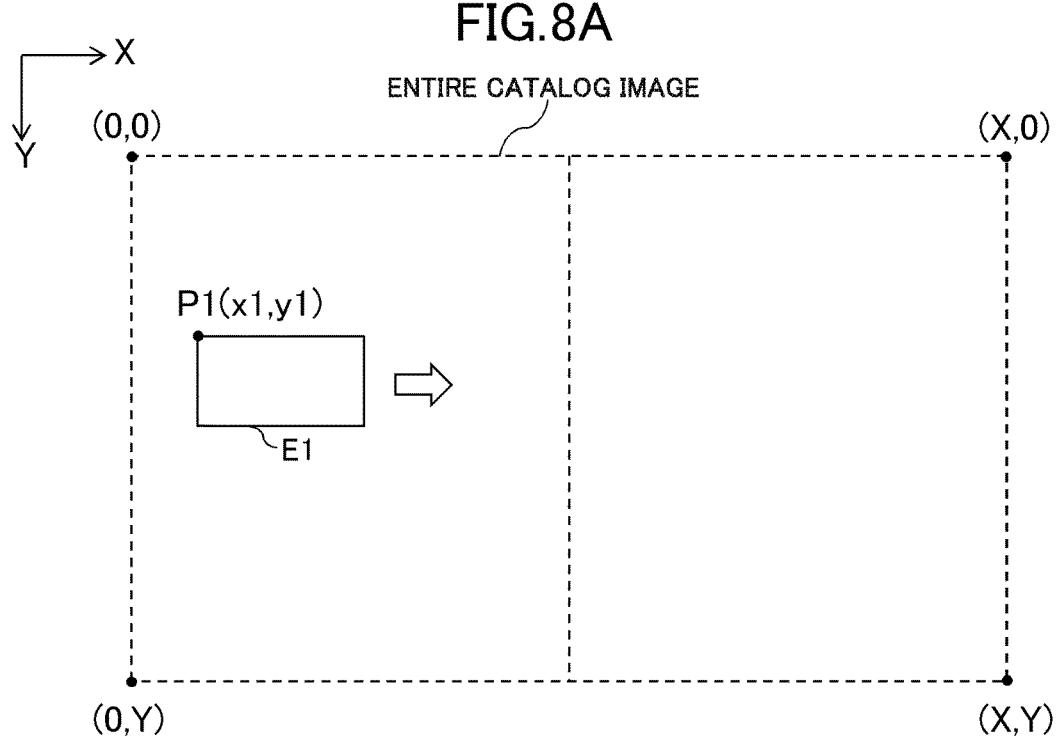
FIG. 8A is a diagram illustrating coordinates of a display area before movement.
Figure 8B:
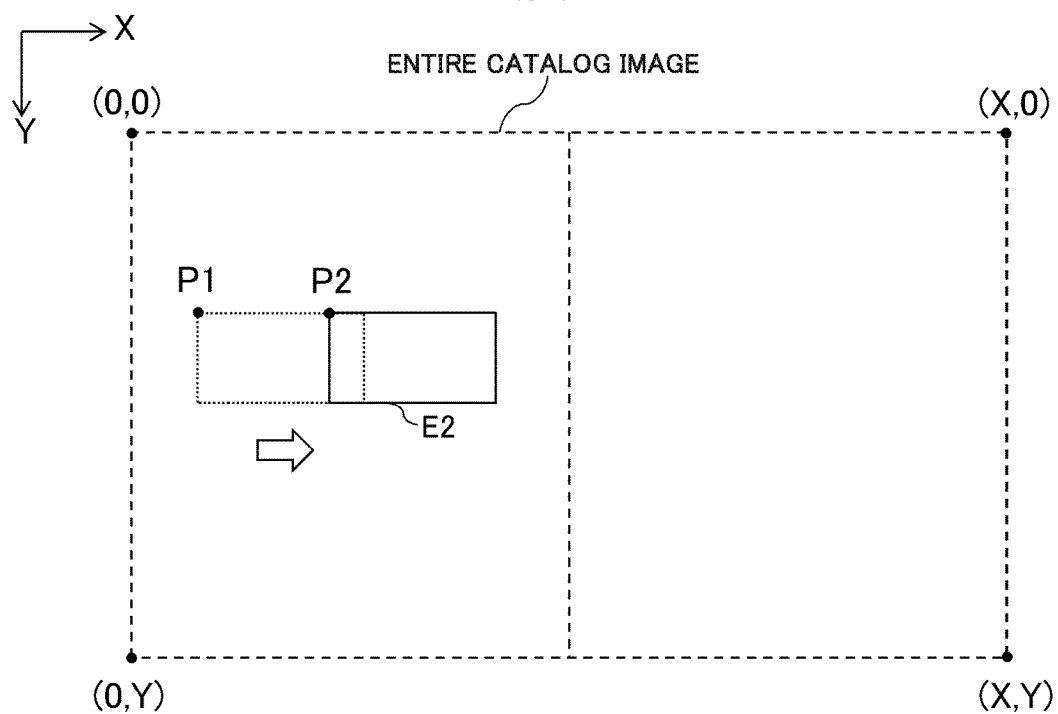
FIG. 8B is a diagram illustrating coordinates of a display area after movement.

Subsequently, the displacement amount calculating unit 14 calculates coordinates P2 of the display area E2 after the user has moved the display system 10 (see FIG. 1B) according to the expression (1) (S106) based on the coordinates P1 of the display area E1 before the user moved the display system 10 (see FIG. 1A) and the movement vector V. FIGS. 8A and 8B show display areas E and coordinates P respectively corresponding to FIGS. 1A and 1B. When receiving a correction coefficient α from the calibration processing unit 17, the displacement amount calculating unit 14 calculates coordinates P2 in view of the correction coefficient α.

The displacement amount calculating unit 14 then calculates display magnification Z2 of the current frame image based on the feature points extracted in S103 (S107). In the examples of FIGS. 1A and 1B, the display system 10 moves within the XY coordinate plane, and thus the display magnification Z2 is 1. On the other hand, as shown in FIG. 6 for example, when the user moves the display system 10 in Z direction in the state shown in FIG. 1B (direction away from the user's eyes), the display magnification Z2 is Z1+(t2/t1)β according to the expression (3).

The display area determining unit 15 determines whether the display area E2 extends off the range of the entire catalog image in the XY coordinate plane including the entire catalog image after the user has moved the display system 10 (see FIG. 8B) (S108).

If the display area E2 does not extend off the range of the entire catalog image after the user has moved the display system 10, the document image specifying unit 16 specifies a partial image based on the coordinates P2 of the display area E2 after the display system 10 has been moved and the display magnification Z2 of the current frame image, respectively calculated in S106 and S107. Specifically, the document image specifying unit 16 specifies a partial image, to which display magnification is set to Z2, in the range of the display area E2 referenced to the coordinates P2 in the entire catalog image.

Figure 9:
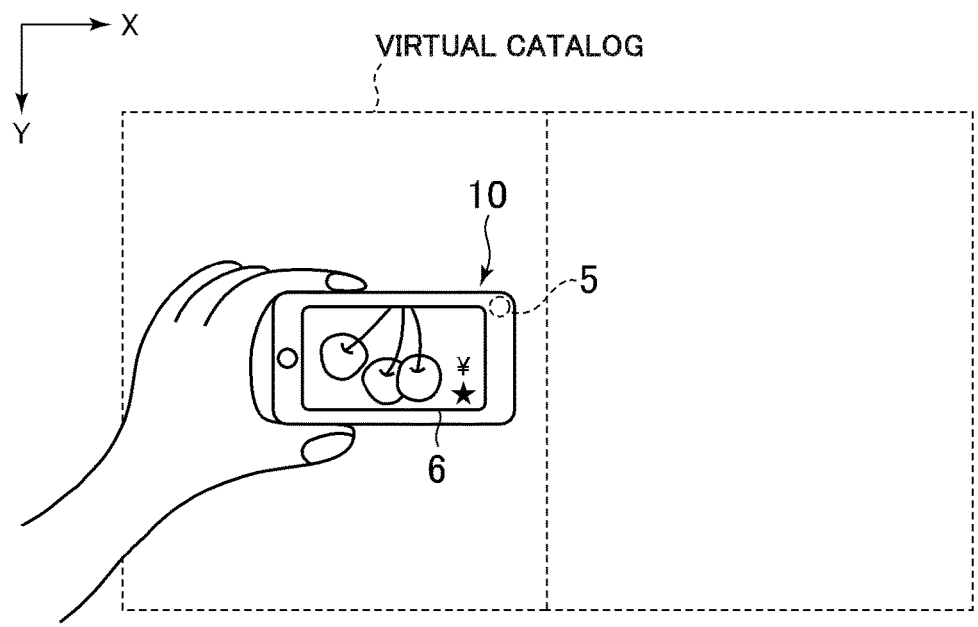
FIG. 9 is a diagram illustrating a current frame image.

The display unit 6 updates the partial image (see FIG. 1A) currently displayed on the display unit 6 to the partial image specified in S110, and displays the updated image (S110). When the display magnification Z2 is changed (increased here) as shown in FIG. 6, the display unit 6 displays the enlarged partial image as shown in FIG. 9, for example.

In S108, if the display area E2 extends off the range of the entire catalog image after the user has moved the display system 10, the processing returns to S101. With this, the partial image is not updated, and the display unit 6 continues to display the immediate previous partial image. For example, the display unit 6 continues to display an image of the edge of the entire catalog image. In this regard, when the display area E2 extends off the range of the entire catalog image after the user has moved the display system 10, alerting sound or message may be notified to the user, or the terminal (here, smartphone) may be vibrated.

When it is determined that there is a long touch in S101, the touch detecting unit 11 further determines whether the touch is released from the display screen (S111). If the touch is released, the processing proceeds to S102. If the touch is not released, the processing of S111 is repeated. With this, while the user is touching the display screen, processing of S102 and subsequent steps are not executed. As such, the partial image is not updated and the immediate previous partial image continues to be displayed. This processing enables to keep displaying the partial image shown in FIG. 1B even though the user changes his/her posture or moves to another place while touching the display screen with a finger when the partial image shown in FIG. 1B is displayed on the display unit 6, for example. After changing the posture or moving to another place, the user can still continue to view the partial image.

Figure 10:
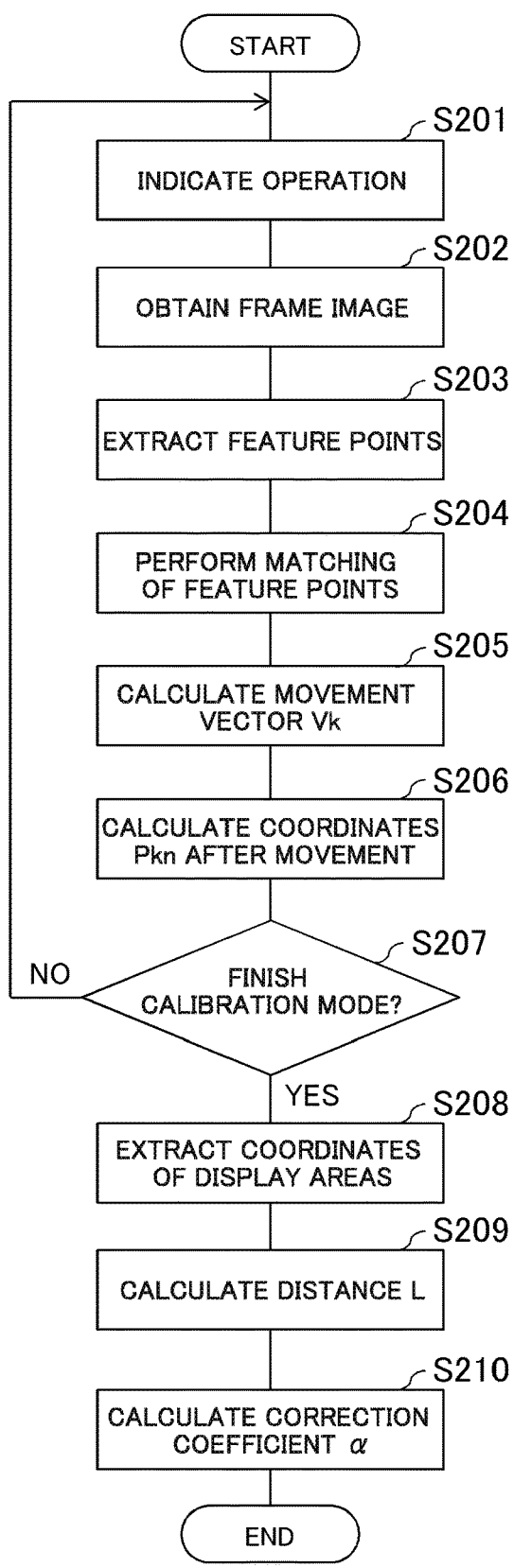
FIG. 10 is an operational flow chart of a calibration processing unit.

FIG. 10 is an operational flow chart of the calibration processing unit 17. For example, when the user selects a calibration mode on a menu screen of the display system 10, the calibration processing unit 17 executes a calibration operation. The calibration processing unit 17 executes the calibration operation and determines a correction coefficient α of the expression (1).

The calibration processing unit 17 indicates the user to move the display system 10 in a desired range (S201).

When the user moves the display system 10, the image obtaining unit 12 obtains a previous frame image and a current frame image from the frame memory 4a (S202). The feature point extracting unit 13 then extracts feature points respectively in the previous frame image and the current frame image obtained in S202 (S203), and performs image matching (S204). Subsequently, the displacement amount calculating unit 14 calculates a movement vector Vk of the display system 10 based on the processing results of S203 and S204 (S205).

The displacement amount calculating unit 14 calculates coordinates Pkn of the display area En after the user has moved the display system 10 according to the following expression (4) based on coordinates Pk1 of the display area E1 before the user has moved the display system 10 and the movement vector Vk (S206).

$$Pkn = Pk1 + Vk \tag{4}$$

Figure 11:
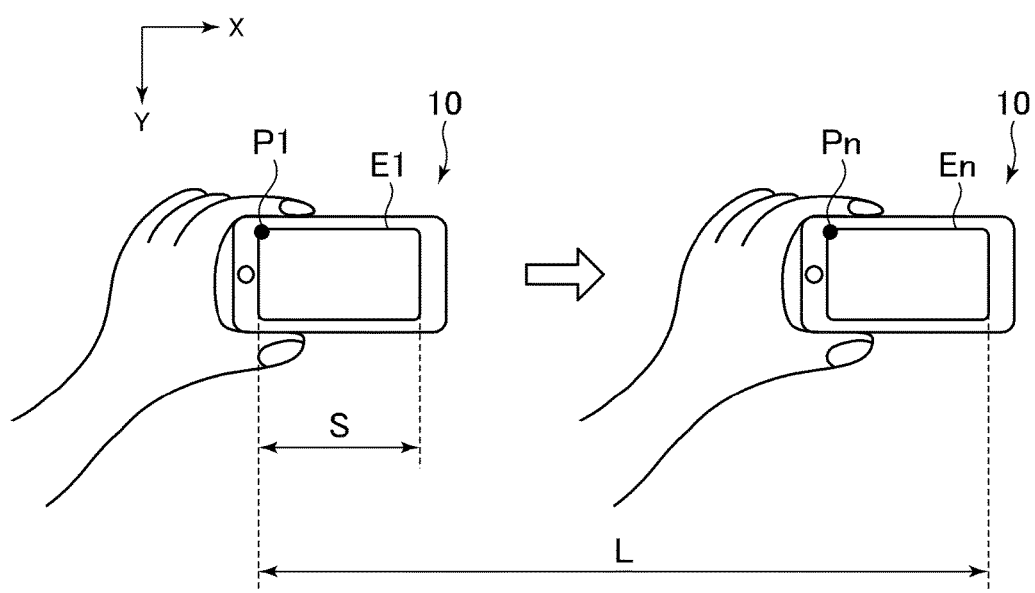
FIG. 11 is a diagram for explaining a method for calculating a correction coefficient by the calibration processing unit.

The processing of S201 to S206 is repeated until the user stops moving the display system 10 and finishes the operation of the calibration mode. For example, as shown in FIG. 11, while the user moves the display system 10 from left to right by a desired distance L, the processing of S201 to S206 is repeated n times.

When the user finishes the calibration mode, the calibration processing unit 17 extracts coordinates Pk1 to Pkn of apexes in respective display areas E for each frame (S208).

Subsequently, the calibration processing unit 17 calculates the user's desired distance L based on the coordinates Pk1 to Pkn extracted in S208 (S209). Specifically, the calibration processing unit 17 calculates the distance L in the XY coordinate plane shown in FIG. 11, for example, based on the coordinates Pk1 having the smallest X coordinate value and the coordinates Pkn having the largest X coordinate value. In this regard, the distance L can be calculated by |x(Pkn)−x(Pk1)|+Sx (width of display area E in X direction).

The calibration processing unit 17 then calculates a correction coefficient α based on the distance L (see FIG. 11) calculated in S209 and the width W (see FIG. 5) of the entire catalog image (S210). For example, when the user moves the display system 10 in the X direction by the distance L for one time and the display unit 6 is set to scroll the width (distance W) of the entire catalog image, the calibration processing unit 17 calculates a correction coefficient α according to the following expression (5).

$$\alpha = W/L \tag{5}$$

The correction coefficient α calculated in S210 is used in the expression (1) in the processing of S106 in FIG. 7. A correction coefficient can be calculated in the same way regarding Y direction and Z direction. This enables the user to scroll and view the entire catalog image by the operation of the display system 10 in a desired range. A correction coefficient may be determined in advance without using the calibration operation.

The present invention is not limited to the above embodiment. For example, when the user slides the display screen of the display unit 6 with a finger, the partial image displayed on the display unit 6 may be scrolled according to sliding operation of the finger.

The display system 10 may include a function to identify movement of the user's hand by the camera 5 and execute processing according to the movement of the hand. For example, in a case where the entire catalog image includes multiple pages and the user performs a predetermined action to turn pages manually in front of the camera 5, pages of the partial image displayed on the display unit 6 may be changed. The partial image to be displayed after a page is turned may be an image corresponding to the coordinates the same as the coordinates of the display area before the page is turned, or an image at the top of the new page.

When the user draws a mark with a finger or a pen on the display screen (touch panel) on which the partial image is displayed, the display system 10 may display the mark drawn by the user when the corresponding area of the partial image is displayed again. In this case, the display system 10 stores the mark drawn in association with the coordinates of the displayed partial image, and, when the partial area including the coordinates are displayed again, displays the mark stored and associated with the coordinates.

Here, the display system 10 of the present invention may be composed of a portable terminal (e.g., smartphone) as described above, or include a portable terminal and a server. In the latter display system 10, for example, the portable terminal may include a camera 5 and a display unit 6 (display screen), and the server may include a displacement amount calculating unit 14 and a document image specifying unit 16.

In the above embodiment, during a time period in which the display unit 6 (display screen) is touched for a predetermined period of time and then the touch is released, the smartphone (display system 10) does not execute processing for calculating a displacement amount. That is, in the above embodiment, the touch detecting unit 11 determines that a pause request is received at the time when a predetermined period of time has passed with the display unit 6 (display screen) being touched, and that the pause is released at the time when the touch is released. The method for receiving the pause and release requests from the user is not limited to the above manner of the touch detecting unit 11, but can use any known method.

When a displacement amount of the smartphone (display system 10) is used for another processing during a time period in which the display unit 6 is touched for a predetermined period of time and then the touch is released, in other words, during the pause, the displacement amount calculating unit 14 may continue to calculate the displacement amount. In this case, the document image specifying unit 16 may specify the partial image by eliminating the displacement amount of the smartphone (display system 10) during the pause from the displacement amount calculated when the partial area is specified. That is, the document image specifying unit 16 may specify the partial image ignoring the displacement amount calculated by the displacement amount calculating unit 14 during the pause.

The invention claimed is:

1. A display system, including a processor, comprising:
   a display screen for a portable terminal that displays a larger size document image than a size of a display area;
   a calculating unit, within the processor, for calculating a displacement direction and a displacement amount of the portable terminal on a virtual surface set along the display screen;
   a specifying unit, within the processor, for specifying, in the document image, a first partial area to be displayed in place of a second partial area of the document image currently displayed on the display screen, based on the displacement direction and the displacement amount that are calculated by the calculating unit, a distance between the first partial area and the second partial area being determined based on the displacement amount and a first correction coefficient; and
   a calibration processing unit, within the processor, for determining the first correction coefficient based on a possible movement of the portable terminal held by a user and a width of the document image,
   wherein the calibration processing unit calculates the possible movement of the portable terminal based on coordinates of display areas for a plurality of frames during a calibration mode.

2. The display system according to claim 1, further comprising:
   an image capturing unit for the portable terminal, comprised within the processor, that sequentially captures a plurality of images,
   wherein the calculating unit calculates the displacement direction and the displacement amount based on changes in positions of feature points in the images captured by the image capturing unit.

3. The display system according to claim 2,
   wherein the calculating unit calculates a display magnification of the first partial area of the document image displayed on the display screen based on changes in intervals between the feature points in the captured images, and
   wherein the specifying unit specifies the first partial area in the document image based on the displacement direction, the displacement amount, and the display magnification, which are respectively calculated by the calculating unit.

4. The display system according to claim 3,
   wherein the calculating unit calculates the display magnification based on a change rate of frame images and a second correction coefficient.

5. The display system according to claim 1, further comprising:
   a receiving unit, within the processor, for receiving a pause request from a user,
     wherein, when the pause request is received, the specifying unit removes a first displacement amount of the portable terminal, which is a displacement amount during a period of time from a reception of the pause request to a release of the pause, from a second displacement amount calculated at the time when the first partial area is specified.

6. The display system according to claim 5,
   wherein the receiving unit is a touch detecting unit for detecting a touch on the display screen, and determines that the pause request is received when a predetermined period of time has passed with the display screen being touched and that the pause is released when the touch is released.

7. The display system according to claim 1, further comprising:
   a receiving unit, within the processor, for receiving a pause request from a user,
   wherein, when the receiving unit receives the pause request, the calculating unit stops calculating processing of the displacement amount until the pause is released.

8. The display system according to claim 1, further comprising:
   a touch detecting unit, within the processor, for detecting a touch on the display screen,
   wherein, when a predetermined period of time has passed with the display screen being touched, the display screen continues to display a partial area of the document image while the display screen is touched, the partial area being an area displayed on the display screen at the time the display screen is touched.

9. The display system according to claim 1, further comprising:
   a determining unit, within the processor, for determining whether the first partial area is in a range of the document image, and
   wherein, when the first partial area to be displayed on the display screen is not in the range of the document image, the specifying unit specifies a third partial area at an edge of the document image.

10. The display system according to claim 1,
wherein the calibration processing unit determines the first correction coefficient by dividing the possible movement of the portable terminal by the width of the document image.

11. The display system according to claim 1,
wherein the calibration processing unit calculates the possible movement of the portable terminal based on a first coordinate having the smallest X coordinate value and a second coordinate having the largest X coordinate value among the coordinates obtained during the calibration mode.

12. A display method to be executed by a computer, comprising:
- calculating a displacement direction and a displacement amount of a portable terminal on a virtual surface set along a display screen provided to the portable terminal that displays a larger size document image than a size of the display area; and
- specifying, in the document image, a first partial area to be displayed in place of a second partial area of the document image currently displayed on the display screen, based on the calculated displacement direction and the calculated displacement amount, a distance between the first partial area and the second partial area being determined based on the displacement amount and a first correction coefficient; and
- a calibration processing unit, within the processor, for determining the first correction coefficient based on a possible movement of the portable terminal held by a user and a width of the document image
wherein the calibration processing unit calculates the possible movement of the portable terminal based on coordinates of display areas for a plurality of frames during a calibration mode.

13. A non-transitory computer-readable storage medium having stored thereon a program for causing a computer to:
- calculate a displacement direction and a displacement amount of a portable terminal on a virtual surface set along a display screen provided to the portable terminal that displays a larger size document image than a size of the display area; and
- specify, in the document image, a first partial area to be displayed in place of a second partial area of the document image currently displayed on the display screen, based on the calculated displacement direction and the calculated displacement amount, a distance between the first partial area and the second partial area being determined based on the displacement amount and a first correction coefficient; and
- a calibration processing unit, within the processor, for determining the first correction coefficient based on a possible movement of the portable terminal held by a user and a width of the document image,
wherein the calibration processing unit calculates the possible movement of the portable terminal based on coordinates of display areas for a plurality of frames during a calibration mode.

* * * * *